Patented Jan. 9, 1934

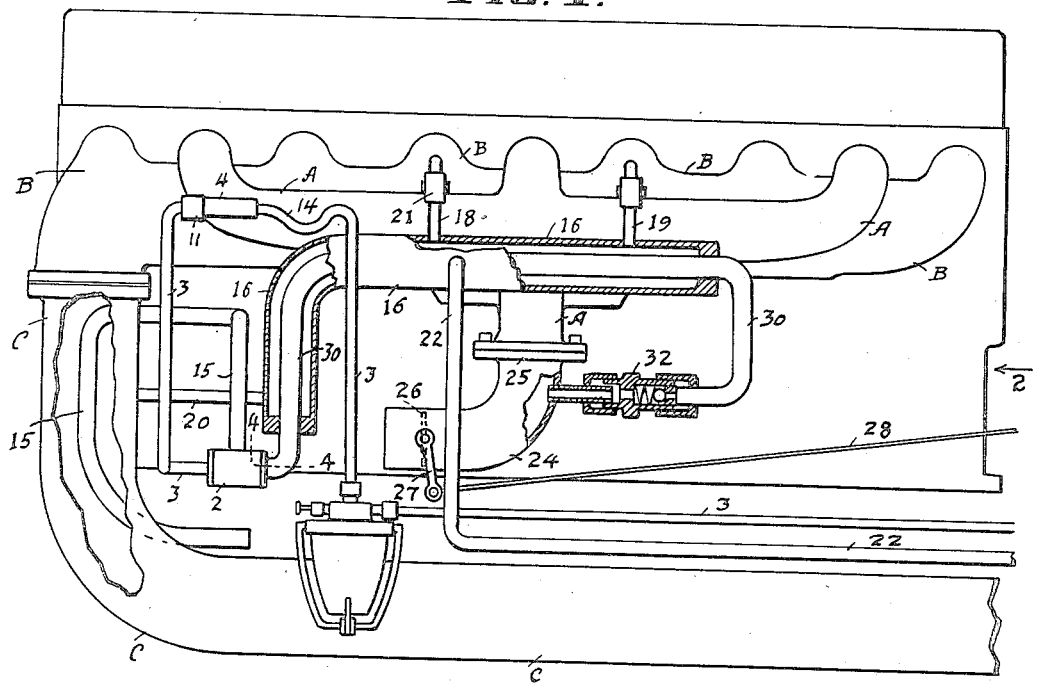

1,942,875

UNITED STATES PATENT OFFICE 1,942,875

CARBURETING MEANS

Carl W. Painter, Anderson, Ind.

Application February 3, 1932. Serial No. 590,545

2 Claims. (Cl. 261—13)

My invention relates to improvements in internal combustion engines. An outstanding problem, in efforts to improve the performance of an engine of the above type, has been that of providing a combustible mixture of high efficiency, and of obtaining effective delivery thereof to the combustion chamber of the engine.

Disadvantages have been that only a relatively low percentage of the full inherent energy of the hydrocarbon fuel (hereinafter referred to as gasoline) is utilized. Moreover, on account of the mixture being of too high hydrocarbon content, and of the imperfect delivery thereof there is the subjecting of the engine to a temperature of relatively high degree.

Due to the above disadvantages, there has been the necessity of resorting to temperature minimizing means such as the common fan blower.

The present invention has to do with means for carbureting, and for the formation of combustible charges, and for the effective disposition of such charges. In prefacing the statement of the objects of my invention, it will be understood that the usual engine suction is the power depended upon for the drawing of the mixture into the engine, and that there is present the usual supply inlet conduit at the mouth of the intake manifold, and also, that the inflow through the said conduit is controlled by a manually operated throttle valve of the common butterfly type.

The invention has been matured upon the thought of primarily atomizing the supplied gasoline, and the combining therewith of air; then in a suitable mixing box, the combining, mixing and impregnating with the above named primary mixture of additional air which has been warmed; and then subjecting the mixture leaving the mixture chamber, to a period of additional warming, preliminary to its being passed into the supply inlet conduit, whence the said mixture is subjected to the commingling therewith of secondary air that is rushing through said supply inlet conduit.

The mixture having been so prepared, and so volatilized in advance of its advent into the supply conduit, there is assured the ready and complete commingling therewith of the relatively large air secondary supply that rushes through the supply conduit, and an effective delivery to the discharge portion of the intake manifold of a mixture which while of relatively low hydrocarbon content, is of proper explosive quality and driving energy.

In accordance with the above preamble, the objects of my invention are to provide a carbureting and charge forming means which will be economical of manufacture, durable, and effective for the purposes intended. The invention is embodied in and the above named general objects, as well as more specific purposes hereinafter referred to, are accomplished by the new construction, combination and arrangement of parts described herein, and which are illustrated in the accompanying drawing.

It will be understood that changes, modifications and variations may be made, within the scope of the invention as it is defined in the appended claims, without departing from the essence or principle of the invention.

The several parts of my invention, as they appear in the different views in the drawing are identified by suitable characters of reference.

Figure 1 is a side view of my improved carbureting and charge forming means constructed in form and arrangement for application to an engine of conventional type.

Figure 2 is an end view of Figure 1, taken in the direction of arrow 2.

Figure 3 is an enlarged central sectional view of the atomizer, and the primary air-inlet fitting.

Figure 4 is an enlarged sectional view of the mixing box taken on the line 4—4 in Figure 1.

Figure 5 is a detached view showing a shut-off means of modified form, for the liquid-fuel line.

The engine, in connection with which the invention is shown, has the usual intake manifold A, exhaust manifold B, and exhaust pipe C.

Supported by a suitable bracket 1 which is adapted to be fastened to the engine structure, is an entry chamber which I designate as a mixing box 2. Communicating with the mixing box at its side is a liquid-fuel pipe 3 which extends upwardly to a plane above, thence downwardly and to the gasoline supply tank (not shown).

In the said pipe 3 is an atomizer which consists of a cylindrical body piece 4 into whose ends the sections of pipe 3 are secured. Centrally of said body piece 4 is a first tapered bore 6, and a second tapered bore 8, the latter being the smaller in diameter. These bores are in straight alignment, the larger diameter of the first bore communicating with the smaller diameter of the other bore and there being thus formed an annular baffle wall 10. This atomizer device is positioned so that the flow of the fuel has entry through the smaller diameter of the larger bore 6, it being baffled by the baffle wall 10, as it passes into bore 8. Integrated with the said body piece 4 is an extension 11, in which is provided an aperture 12 through which outside air is drawn by suction into the liquid-fuel pipe, at a point adjacent to the atomizer, and between said atomizer and the mixing box 2. In the horizontal portion of pipe 3 is a downwardly curved trap 14, the function of which will presently be referred to.

An air feed pipe 15 which is open to the outside air, extends into the said mixing box at an angle oblique to the plane of the entering portion of the liquid-fuel line 3. This pipe 15 is of the generally curved formation as shown in Figure 1, and its body portion is disposed within the interior of the exhaust pipe C, thereby being subjected to the heat of the exhaust gases of the engine. The pipe 15 is of such arrangement and capacity, with relation to the arrangement and capacity of pipe 3, that the air entering 2 from pipe 15, leads the primary air-gasoline mixture that is entering through pipe 3.

A heater 16 which consists of a tubular member having closed ends, and which is L shaped in formation, the shorter leg of which is directed downwardly, is supported by a suitable bracket 17. Flue pipes 18, 19 and 20 which extend from said heater and into the exhaust manifold B and exhaust pipe C permit of a free flow of hot exhaust gases into said heater. Valves 21 may be provided in these flue pipes. A vent pipe 22 is extended from said heater. Associated with the said heater 16 is a supply inlet conduit 24 which is fastened by its flange 25 to the flange of the intake manifold A. This supply inlet conduit is provided with a throttle valve 26, and which by a crank 27 and connecting rod 28 is manually operable by a pedal, or by a hand lever (not shown).

A mixture conducting pipe 30 extends from said mixing box 2 and through the said heater 16, to the interior of the supply inlet conduit 24. In said pipe 30 is a check valve 32.

Whereas, the several parts in the embodiment described are of preferred general form and construction, and their details of connection and arrangement are practicable, it will be understood that minor changes may be made therein in line with engines of various sizes and purposes.

With the engine at rest, the throttle is in the closed position shown. Upon starting the engine, there is the powerful suction through liquid-fuel feed pipe 3. The gasoline being drawn through the atomizer is vaporized, and together with the air that is drawn through aperture 12, the primary mixture thus formed is passed forcibly into the mixing chamber 2. By the force of said suction, a strong current of air is drawn through the pipe 15 into said mixing chamber. The mixture formed in the mixing chamber, and which consists of the primary air-gasoline mixture coming from pipe 3, and of the warm air drawn through pipe 15, then proceeds through the pipe 30. In its travel through pipe 30, the effect of the heater 16 is to volatilize said mixture, during its progress through the pipe 30 and into inlet conduit 24. Simultaneously the current of outside air is being drawn through the supply inlet conduit 24. The said mixture being of highly volatilized quality as it enters the said supply inlet conduit, there is ready, equable and complete commingling therewith of the air that is being drawn forcibly, and in relatively large volume through conduit 24. With this complete and equably formed dry mixture, the quality of the mixture throughout the entire extent of the upper or discharging portion of the intake manifold, is correspondingly uniform.

It will be understood that in starting the engine, the air passing through the pipe 15 will not as yet have become heated, and that the mixture passing to the explosion chambers of the engine is of maximum richness.

As the operation of the engine progresses, and the flow of air through supply inlet conduit 24 is increased (by opening the throttle) there is a lessening of suction force at the atomizer. At the same time the pipe 15, and the heater 16 will have become heated. The mixture formed in the mixing box of the primary air-gasoline vapor from pipe 3 and the heated air from pipe 15, is conducted through the pipe 30 in which its volatilization is completed. The mixture having been completely volatilized before it will have reached the supply inlet conduit, the effect of the outside air that is being drawn into the supply inlet conduit is to mingle with said volatilized mixture uniformly and the mixture as it passes onwardly and through the intake manifold is of maximum efficiency.

By the present invention variation of the feed of the liquid fuel is automatic, and the variation of the engine power is had solely by operating of the throttle (that is to say—supplying air). The controlling of the operation of the engine is therefore simplified, and an explosive mixture of maximum intensity is had with the expenditure of a minimum amount of gasoline.

Operation of the engine is accompanied by low degree of engine heat, and the use of air cooling devices for water circulating means is unnecessary, and cooling devices such as fan wheels and the like may be dispensed with.

In the present installation, wherein the atomizer 4 is disposed at a plane above the plane of the level of the gasoline, the trap 14 constitutes an automatic fuel shut-off when the engine is not operating.

If for structural reasons, it may be desirable to locate the atomizer at position more nearly adjacent to the mixing box, as shown in the modification at Figure 5, a valve 34 is provided, and which is manually operated to shut off the gasoline flow when the engine is not operating. The function of the check valve 32 is to prevent interruption of fuel flow in cases of pre-ignition or irregular firing.

It is thought that the above advantages are the result of the formation of the primary air-gasoline mixture, and of its subjection to the powerful suction operating through pipe 3, and of the breaking up of this primary mixture by the impulse driven jet of air passing through pipe 15, and then the volatilizing of this pre-warmed mixture through the relatively long path of the heater 16, thereby forming a mixture which will have become completely volatilized before its entry into the air supply conduit 24. With the above result accomplished, there is such combination therewith of the air that is being drawn into conduit 24, that the charge-formation that proceeds through the intake manifold, is dry, uniform in consistency, and of positive explosive quality and strength.

When the engine is idling and the throttle is in almost closed position the moment of vacuum between ignitions is longer, (taking in more gas), than it is when the throttle is open. When the throttle is open the vacuum is weaker and the moments thereof while more frequent, are shorter, (taking in less gas).

By the system of carburetion as effected by the mechanism above described, the necessity either of vacuum system, or of pumping means for the introduction of gasoline flow, is dispensed with.

What I claim as my invention, is—

1. In an internal combustion engine having intake and exhaust manifolds and an exhaust pipe, and a supply conduit for said intake manifold, the said supply conduit having a throttle, a mixing box, a liquid-fuel pipe communicating with said mixing box, an atomizer in said liquid-fuel pipe at a point distant from the mixing box, an air inlet for said liquid-fuel pipe adjacent to said atomizer and between the atomizer and the said mixing box, an air feed pipe open to the outside air, extended into and out of the exhaust pipe, and communicating with the said mixing box, a relatively long heater device deriving its energy from the exhaust manifold, and a mixture conducting pipe extending from the said mixing box and through the said heater and communicating with the supply conduit of the intake manifold at a point between the throttle thereof and the body portion of said intake manifold.

2. In an internal combustion engine having intake and exhaust manifolds and an exhaust pipe, and s supply conduit for said intake manifold, the said supply conduit having a throttle, a mixing box, a liquid-fuel pipe communicating with said mixing box, an atomizer in said liquid-fuel pipe, an air inlet for said liquid-fuel pipe between the atomizer and the mixing box, an air feed pipe open to the outside air, extending into and out of the exhaust pipe and communicating with said mixing box, a relatively long L shaped heater device having the shorter leg thereof disposed in upright position, the said heater device deriving its energy from the said exhaust manifold, a mixture conducting pipe extending from said mixing box and through said heater and communicating with the conduit of the intake manifold at a point between the throttle thereof and the body portion of said intake manifold, and a check valve in said mixture conducting pipe.

CARL W. PAINTER.